(12) United States Patent
Petrov et al.

(10) Patent No.: US 8,793,655 B2
(45) Date of Patent: *Jul. 29, 2014

(54) DELTA COMPRESSION USING MULTIPLE POINTERS

(71) Applicant: Microsoft Corporation, Redmond, WA (US)

(72) Inventors: Alexander Petrov, Bellevue, WA (US); Thomas McGuire, Georgetown, TX (US); Michael Sliger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,519

(22) Filed: Jan. 30, 2013

(65) Prior Publication Data

US 2013/0145355 A1    Jun. 6, 2013

Related U.S. Application Data

(63) Continuation of application No. 12/948,603, filed on Nov. 17, 2010, now Pat. No. 8,370,804, which is a continuation of application No. 11/472,714, filed on Jun. 22, 2006, now Pat. No. 7,861,224.

(51) Int. Cl.
*G06F 9/44*    (2006.01)

(52) U.S. Cl.
USPC .......................................... 717/122

(58) Field of Classification Search
USPC ........................................... 717/122
See application file for complete search history.

(56) References Cited

U.S. PATENT DOCUMENTS

| | | | |
|---|---|---|---|
| 7,392,260 | B2 | 6/2008 | Ren |
| 7,676,506 | B2 | 3/2010 | Reinsch |
| 2002/0010702 | A1 | 1/2002 | Ajtai |
| 2004/0225996 | A1 | 11/2004 | Venkatesan |
| 2005/0219075 | A1 | 10/2005 | Storer |
| 2006/0107260 | A1 | 5/2006 | Motta |
| 2006/0112264 | A1 | 5/2006 | Agarwal |
| 2006/0145896 | A1* | 7/2006 | Venkatesan et al. ............ 341/50 |
| 2007/0208786 | A1* | 9/2007 | Kim .............................. 707/203 |
| 2012/0185612 | A1* | 7/2012 | Zhang et al. .................. 709/247 |

* cited by examiner

*Primary Examiner* — Philip Wang
(74) *Attorney, Agent, or Firm* — Andrew Sanders; Micky Minhas; L. Alan Collins

(57) ABSTRACT

Encoding a new version of a data module includes constructing a delta data module having data for providing the new version of the data module. The delta data module may indicate an encoding for copying data at an offset from one of a number of pointers into different versions of the data module. Decoding a delta data module to provide a new version of a data module includes copying, to the new version of the data module, data relative to a target pointer when an encoding in the delta data module indicates a matching pattern relative to the target pointer, and copying, to the new version of the data module, data relative to at least one other pointer when an encoding in the delta data module indicates a matching pattern relative to the at least one other pointer.

20 Claims, 6 Drawing Sheets

DELTA COMPRESSION USING MULTIPLE POINTERS

RELATED APPLICATIONS

This application is a continuation of and claims benefit from U.S. patent application Ser. No. 12/948,603 that was filed Nov. 17, 2010, and that is a continuation of U.S. patent application Ser. No. 11/472,714 that was filed Jun. 22, 2006, each of which is incorporated herein by reference in its entirety.

BACKGROUND

A software user may sometimes receive one or more updates for the software during its lifetime. These updates may be new versions of the software that the user has purchased or to which the user is entitled based on the user's initial purchase terms. In some cases the updates may address a problem with the software and in some cases the updates may be provided at no charge by the manufacturer/distributor of the software.

Although a user may receive updates in the form a CD (or equivalent) that the manufacturer/distributor sends to the user, in many cases it is preferable to use the Internet (or perhaps another communication network) to provide updates to users to avoid the cost of making and distributing CD's. The manufacturer/distributor may provide the updates on its Web site. In instances where not all users are entitled to the update (e.g., a new version that users must purchase), the manufacturer may take steps to restrict access to the updates to only authorized users (e.g., users that have paid).

One difficulty with using the Web to distribute updates is that many software programs are relatively large so that transmission of the entire software (program to all users (or even an appreciable subset of users) is impractical or at least undesirable. In addition, in instances where a user may be updating only a small portion of the software, transmitting the entirety of a version thereof may be redundant.

One technique that addresses these issues is delta compression, where a user is sent data indicative of the differences between an initial version of the software that the user already has and the new version of the software. The user uses the delta compression data and the initial version of the software to construct the new (updated) version of the software. The delta compression data may be constructed by the manufacturer/distributor of the software by concatenating the new version of the software on to the old version of the software and then using a target pointer to traverse through the new version of the software to determine which data is unique and which data matches data that is prior to the target pointer. The location of matching data, relative to the target pointer, is encoded into the delta compression data. However, since it is expected that data in the new version of the software will match data in the initial version, the distance between the target pointer and the matching data (expressed, for example, in a number of bytes or bits between the two) may be relatively large, and thus require a relatively large number of bits for encoding. This large number of bits diminishes the beneficial effects of delta compression encoding.

It is desirable to provide a system that takes advantage of the reductions in data size afforded by delta compression encoding without the disadvantages of the detriments discussed above.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The system described herein encode a new version of a data module by initializing a target pointer to point to a beginning location of the new version of the data module, initializing at least one other pointer to point to a location within an initial version of the data module, and constructing a delta data module having data for providing the new version of the data module using the initial version of the data module. Data in the delta data module may indicate an encoding for copying data at an offset from the target pointer or an encoding for copying data at an offset from one of the other pointers. The initial version of the data module may be preprocessed to minimize differences between the initial version of the data module and the new version of the data module. There may be only one other pointer that is initialized to point to a beginning location of the new version of the data module. There may also be a table that indicates a mapping between the target pointer and the one other pointer.

The system described herein also decodes a delta data module to provide a new version of a data module based on an initial version of the data module by initializing a target pointer to point to a beginning location of the new version of the data module, decoding literal data from the delta data module when an encoding therein indicates the presence of literal data, copying, to the new version of the data module, data relative to the target pointer when an encoding in the delta data module indicates a matching pattern relative to the target pointer, and copying, to the new version of the data module, data relative to at least one other pointer when an encoding in the delta data module indicates a matching pattern relative to the at least one other pointer. Prior to decoding data, it is possible to preprocess the initial version of the data module according to preprocessing instructions which may be provided as part of the delta data module. A location for the at least one other pointer may be provided by a mapping from the target pointer to the at least one other pointer.

The system described herein communicates a new version of a data module by constructing a delta data module by initializing a target pointer to point to a beginning location of the new version of the data module, initializing at least one other pointer to point to a location within an initial version of the data module, and providing data indicative of the new version of the data module. Data in the delta data module may indicate an encoding for copying data at an offset from one of the pointers. The system transmits the delta data module using, for example, the Internet.

DETAILED DESCRIPTION

Described herein are various technologies and techniques for providing delta compression data. Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

The system described herein relates to a type of data compression called "delta compression", where an existing initial version of a data file is updated to provide a new version of the data file. For example, in the case of updating an initial version of software to a new version of the software, it is possible to represent the new version of software as a combination of the initial version of software and the differences therebetween. Similarly, a revised document may be represented as a combination of an initial version of the document and the changes thereto to provide a resulting new version of the document. An advantage of this type of compression is that the representation of the differences between the initial version and the new version may be much more compact (contain less data) than the new version itself. In instances where new versions of data are provided to recipients via a data communication link, such as the Internet, reducing the amount of data that needs to be transmitted over the communication link is especially helpful.

Figure 1A:
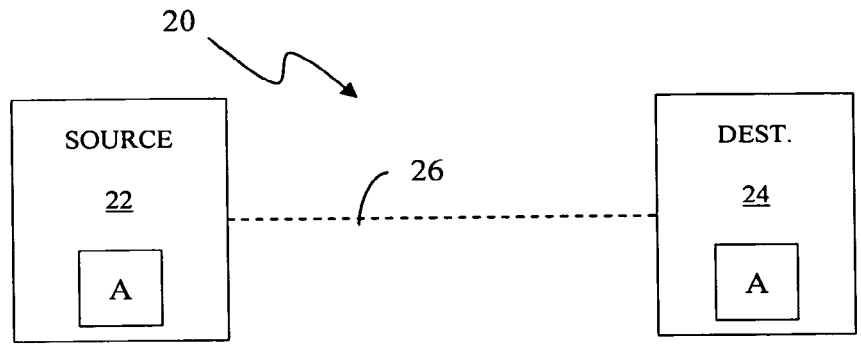
FIG. 1A is diagram illustrating a source and a destination coupled by a communication link each having an initial version of a data module according to the system described herein.

Referring to FIG. 1A, a diagram 20 illustrates a source 22 and a destination 24 connected via a communication link 26. The source 22 may represent any source of new data, updates of data, etc., such as a software manufacturer and/or distributor that provides updates of software to users. The source 22 could also represent a database that is updated periodically, or any other source of data that is modified where the modifications are distributed from the source 22. The destination 24 may represent any consumer of the updated data from the source 22. For example, if the source 22 is a software manufacturer/distributor, then the destination 24 may represent a software customer. Similarly, if the source 22 is a database for bank accounts, the destination 24 may represent a branch of the bank or may represent an ATM machine for the bank. The communication link 26 may be any data transmission link capable of transmitting data between the source 22 in the destination 24. In an embodiment herein, the communication link 26 is the Internet, although any other appropriate data transmission mechanism may be used.

In the diagram 20 of FIG. 1A, the source 22 is shown as having a data module, A, and the destination 24 is shown as having an identical data module, A. The data module, A, may represent any collection of computer readable data that may be modified/updated. For example, the data module A may represent a computer software program where the source 22 is a manufacturer/distributor of computer software and the destination 24 is a user/customer. Thus, for example, the software module A may represent software purchased by a customer that the customer loaded on his or her computer from a CD.

Figure 1B:
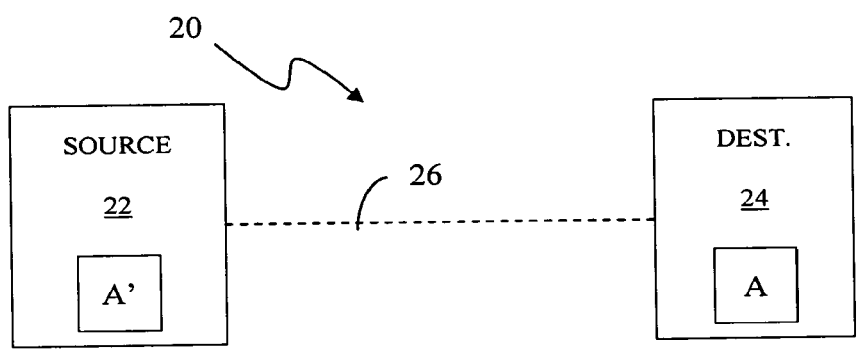
FIG. 1B is diagram illustrating a source and a destination coupled by a communication link where the source has a new version of a data module and the destination still has an initial version of the data module according to the system described herein.

Referring to FIG. 1B, the diagram 20 is modified to show that the data module at the source 22 has been updated to provide a new version of the data module A'. The data module A' may represent a modification of the data module A so that a significant amount of data provided in A' is also found in A. For example, the data module A' may represent a modification of a database corresponding to the data module A. As another example, the data module A' may represent an updated version of a software program represented by the data module A.

It is desirable for the destination to obtain the data module A' by transmitting information from the source 22 to the destination 24 via the communication link 26. Of course, it is always possible to simply transmit the entire data module A' from the source 22 to the destination 24 via the communication link 26. However, it is also desirable to limit the amount of data that needs to be transmitted via the communication link 26. Thus, the system described herein provides a mechanism for the destination 24 to obtain the data module A' while transmitting less than the entire data module A' from the source 22 to the destination 24.

Figure 1C:
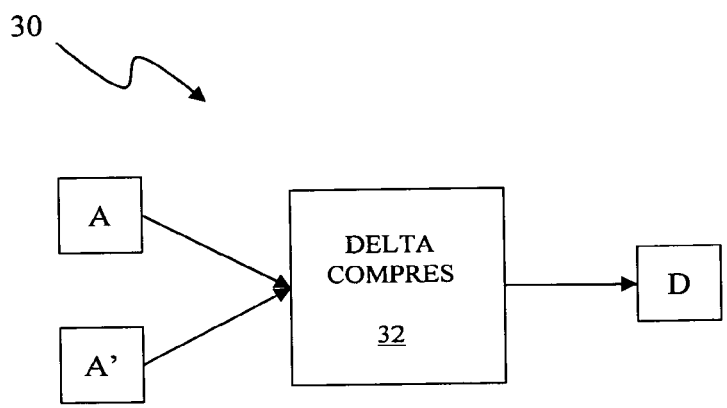
FIG. 1C is a diagram illustrating a delta compression routine that uses a new version of a data module and an initial version of the data module to produce a delta data module according to the system described herein.

Referring to FIG. 1C, a diagram 30 illustrates a delta compression routine 37 that uses as input the previous version of the data module A and the new version of the data module A'. The delta compression routine 32 provides as output a delta data module D. The delta compression routine 32 may be implemented by software operating at the source 22 that provides the functionality for the delta compression routine 32 described herein. Thus, the delta data module D is constructed at the source 22. In other embodiments, the delta compression routine 32 may be executed partially or entirely off-site separate from the source 22). In an embodiment herein, the size of the delta data module D is expected to be much less than the size of the data module A'. Operation of the delta compression routine 32 is described in more detail elsewhere herein.

Figure 1D:
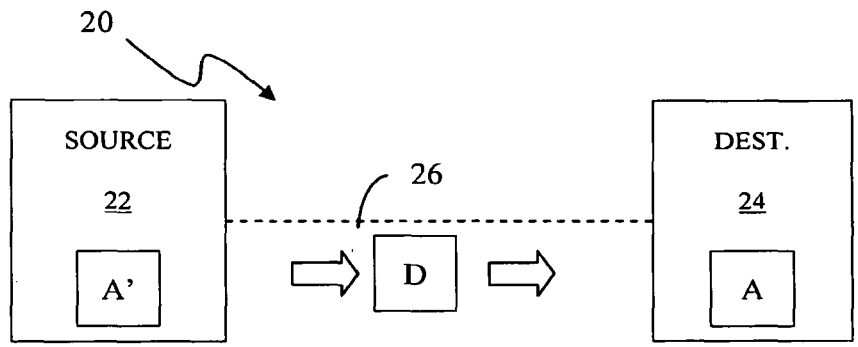
FIG. 1D is a diagram illustrating transferring a delta data module from a source to a destination coupled by a communication link according to the system described herein.

Referring to FIG. 1D, the diagram 20 is illustrated with the delta data module D being transmitted from the source 22 to the destination 24. Transmitting the delta data module D from the source 22 to the destination 24 by the communication link 26 may be provided by any appropriate means, including conventional transmission via the Internet. In some embodiments, the destination 24 may send an acknowledgment signal back to the source 22 once the destination 24 receives the entirety of the data module D. In some embodiments, the delta data module D may be constructed by an entity other than the source 22 and provided to the source 22 for subsequent transmission and/or transmitted by an entity other than the source 22.

Figure 1E:
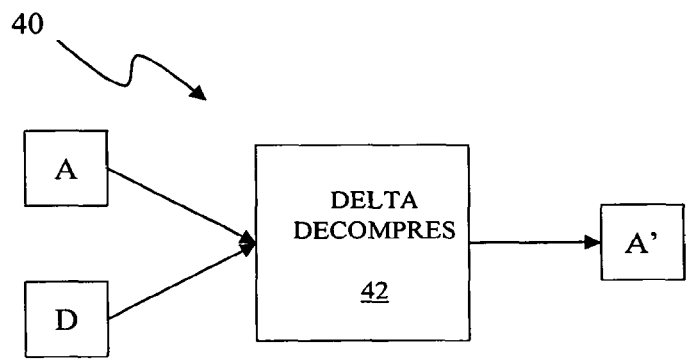
FIG. 1E is a diagram illustrating a delta decompression routine that uses an initial version of a data module and a delta data module to produce a new version of a data module according to the system described herein.

Referring to FIG. 1E, a diagram 40 illustrates a delta decompression routine 42 that uses as input the previous version of the data module A and uses the delta data module D. The delta decompression routine 42 provides as output the new version of the data module A'. The delta decompression routine 42 may be implemented by software operating at the destination 24 to provide the functionality for the delta decompression routine 42 described herein. Thus, the data module A' is reconstructed at the destination without having had to transmit the entire data module A' via the communication link 26. In other embodiments, the delta decompression routine 42 may be executed entirely or in part separate from the destination 24 and the results thereof provided to the destination 24. Operation of the delta decompression routine 42 is described in more detail elsewhere herein.

Figure 1F:
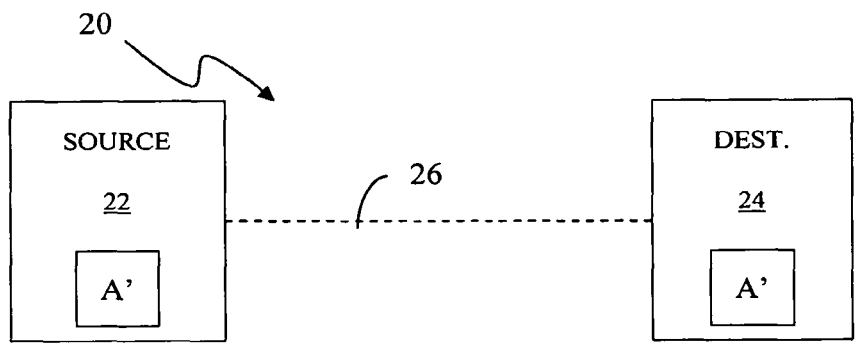
FIG. 1F is diagram illustrating a source and a destination coupled by a communication link each having a new version of a data module according to the system described herein.

Referring to FIG. 1F, the diagram 20 is shown with the data module A', output from the delta decompression routine 42, being saved on the destination 24. Thus, the final state of the system is that the new version data module A' is at both the source 22 and the destination 24. The data module A' originated at the source 22 and was provided to the destination 24 without having to transmit the entirety of data module A' over the communication link 26.

Figure 2:
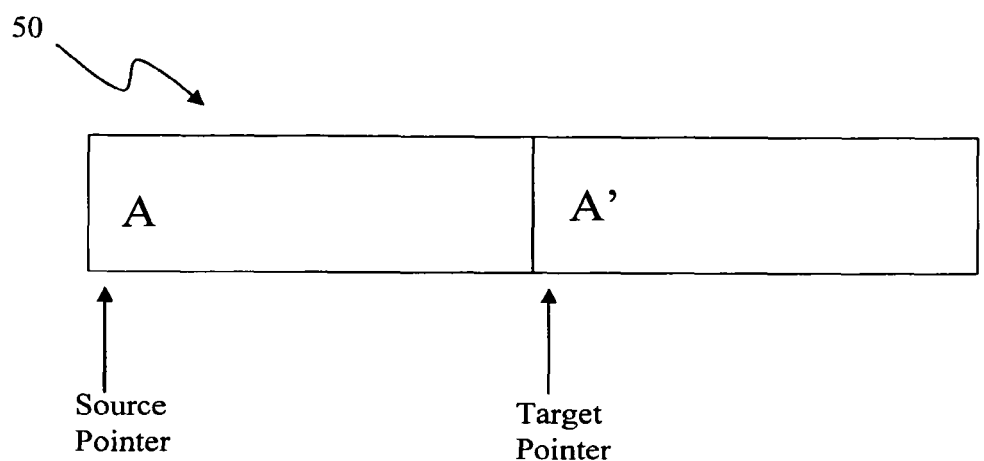
FIG. 2 is diagram illustrating a data buffer used by a compression routine and a decompression routine according to the system described herein.

Referring to FIG. 2, a buffer 50 is used by the delta compression routine 32 to construct the delta data module D and used by the delta decompression routine 42 to construct the new version of the data module A'. The buffer 50 may be a linear buffer having a first part that contains the data module A and a second part that contains the data module A' concatenated onto the first part of the buffer 50. Of course, any other appropriate data structure/arrangement may be used to provide the functionality described herein. There are two pointers, a source pointer that initially points to the beginning of the first part of the buffer 50 and a target pointer that initially points to the second part of the buffer 50. Use of the buffer 50, the source pointer, and the target pointer is discussed in more detail elsewhere herein. Note that, in the course of manipulating the source pointer and the target pointer (discussed in more detail elsewhere herein), it is possible for the source pointer to point to a portion of the buffer 50 corresponding to the data module A' and it is also possible for the target pointer to point to a portion of the buffer 50 corresponding to the data module A.

Figure 3:
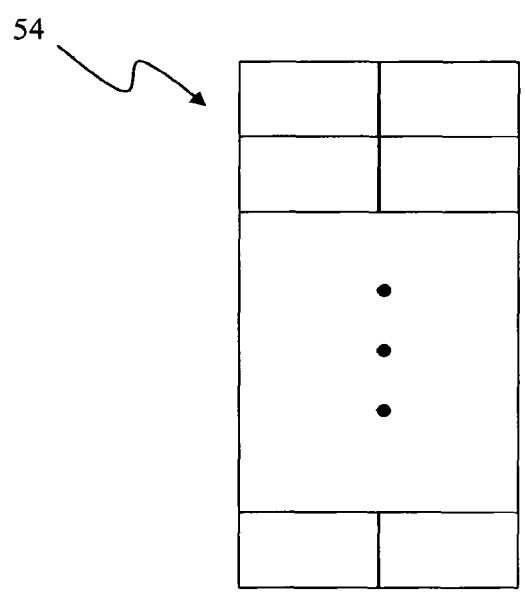
FIG. 3 is a table illustrating a mapping between a target pointer and a source pointer according to the system described herein.

Referring to FIG. 3, a table 54 may be used to map an address space of the target pointer to an address space of the source pointer. The table 54 contains a plurality of entries were each entry has a first part indicating a portion of an address range for the target pointer and a second part indicating a portion of an address range for the source pointer that maps to the portion of the address range for the target pointer in the first part. Thus, given a value (address) of the target pointer, it is possible to use the table 54 to determine the corresponding value (address) of the source pointer. Use of the table 54 is discussed in more detail elsewhere herein.

Figure 4:
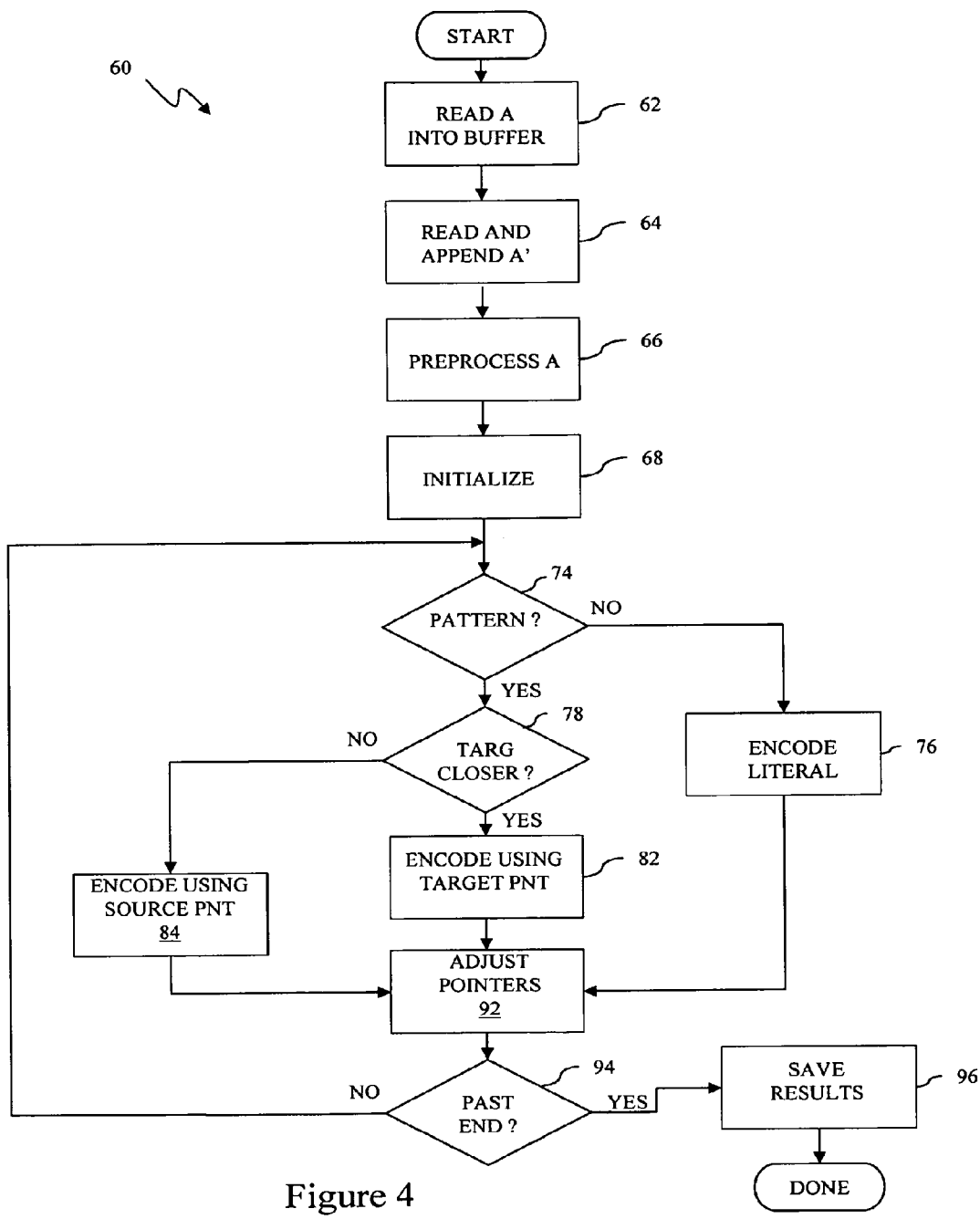
FIG. 4 is a flow chart illustrating steps performed in connection with a delta compression routine constructing a delta data module using an initial version and a new version of a data module according to the system described herein.

Referring to FIG. 4, a flowchart 60 illustrates steps performed in connection with providing delta compression in accordance the delta compression routine 32. Processing begins at a first step 62 where the data module A is read into memory (or some other appropriate storage location). In an embodiment herein, the data module A is read into the first part of the buffer 50 that is provided in volatile memory. Following the step 62 is a step 64 where the data module A' is also read into memory (or some other appropriate storage location). In an embodiment herein, data module A' is read into the second part of the buffer 50 that is provided in volatile memory so that the memory (buffer) contains a concatenation of A and A' like the buffer 50 shown in FIG. 2.

Following the step 64 is a step 66 where preprocessing is performed on the data module A provided in the buffer 50. The purpose of the preprocessing at the step 66 is to make the data module A in the buffer more like the data module A' to reduce the size of the delta data module D. For example, if the data modules A, A' represent software programs, then the preprocessing performed at the step 66 may arrange the different software sections in the data module A to match the arrangement of software sections in the data module A'. In other instances, the preprocessing performed at the step 66 may reassign token values, such as a numeric values representing functions, in the data module A to match the token values in the data module A'.

Of course, the particular preprocessing that is performed at the step 66 depends upon the nature and expected structure of the data modules A, A'. Thus, for example, the preprocessing performed at the step 66 may be different if the data modules A, A' represent databases than if the data modules A, A' represent different versions of a software program. In an embodiment herein, the preprocessing performed on the data module A at the step 66 is represented by a small set of instructions that are included in the delta data module D transmitted from the source 22 to the destination 24. Note that, generally, the preprocessing performed at the step 66 is optional so that it is possible to perform no preprocessing at the step 66.

Following the step 66 is a step 68 where the source pointer and target pointer are initialized. Other initializations may also be performed at the step 68 so that, for example, if the particular encoding that is used requires initialization of encoding constants, that initialization may also be performed at the step 68. Note also that a storage location and appropriate pointers for constructing the delta data module D may also be initialized at the step 68. It is also possible at the step 68 to initialize the mapping table 54, discussed above in connection with FIG. 3. In an embodiment herein, the mapping table 54 is initialized at step 68 to contain a single entry corresponding to the initial values set for the source pointer and target pointer at the step 68.

Following the step 68 is a test step 74 where it is determined if the data pointed to by the target pointer is a pattern that may be encoded according to the particular encoding scheme used. The test at the step 74 determines if the target pointer points to a pattern of data that is identical to a matching pattern of data found in a location in the buffer 50 that is prior to the target pointer from the beginning of the buffer 50 to the target pointer). The system described herein may use any appropriate type of encoding, such as LZ-type encoding or other delta, compression encoding schemes. Thus, the test at the step 74 depends upon the type of encoding that is used. In an embodiment herein, the LZX data compression format provided by the Microsoft Corporation is used.

If it is determined at the test step 74 that the data pointed to by the target pointer can not be matched with any pattern of data found in a location in the buffer 50 that is prior to the target pointer, then control transfers from the test step 74 to a step 76 where the data pointed to by the target pointer is literally encoded. Just as with the test of 74, the mechanism used to literally encoded data at the step 76 depends upon the encoding scheme that is used but, in any event, at the step 76, a literal representation of the data pointed to by the target pointer is placed in the delta data module D. In some embodiments, a special symbol and/or set of symbols may be used to indicate a literal encoding and/or other types of encoding described herein.

If it is determined at the test step 74 that the data pointed to by the target pointer does correspond to a pattern, then control transfers from the test step 74 to a test step 78 where it is determined if the matching pattern in the buffer 50 is closer to the target pointer or to the source pointer. The test at the step 78 determines if the number of bytes of data needed to encode the distance from the target pointer to the matching pattern is greater than the number of bytes needed to encode the distance from the source pointer to the matching data. The system described herein decreases the size of the delta data module D by choosing the closest one of the pointers, thereby decreasing the number of bits needed to encode the distance between the matching pattern and the pointer.

If it is determined at the test step 78 that the matching pattern is closer to the target pointer, then control transfers from the test step 78 to a step 82 where the data pointed to by the target pointer is encoded using an offset (distance) from the target pointer. That is, the matching pattern is referenced using the number of bytes (or bits or some other appropriate data unit) between the current value of the target pointer and the matching data. For example, the encoding performed at the step 82 may indicate that the matching pattern is N bytes from the current value of the target pointer within the buffer 50.

If it is determined at the test step 78 that the matching pattern is not closer to the target pointer (and therefore is closer to the source pointer), then control passes from the test step 78 to a step 84 where the data is encoded using the source pointer (i.e., by encoding the offset from the source pointer to the matching pattern). Following the step 84 is a step 92 were the target pointer and the source pointer are both adjusted. Note that the step 92 also follows the steps 76, 82, discussed above. At the step 92, the target pointer and the source pointer may be adjusted (incremented) by an amount of data encoded at the previous step. Thus, if only a single byte is encoded at a previous step, then the target pointer and the source pointer are incremented by a single byte at the step 92. On the other hand, if one hundred bytes of data are encoded any previous step, then the target pointer and the source pointer may be adjusted at the step 92 by adding a hundred to both the current value of the target pointer and the current value of the source pointer.

Following the step 92 is a test step 94 which determines if the target pointer has been incremented past the end of the buffer 50. If not, then control transfers from the test step 94 back to the step 74, discussed above, to perform another iteration. Otherwise, if it is determined at the test step 94 that the target pointer has been incremented past the end of the buffer 50, then control transfers from the test step 94 to a step 96 where the results of the previous processing (the encoded data, the mapping table, and possibly instructions from the step 66 for preprocessing) are saved to provide the delta data module D. In an embodiment herein, the buffer 50 is discarded at the step 96, and thus, none of the modifications to the data module A performed at the step 66 (or any other modifications) are retained. Following the step 96, processing is complete.

Figure 5:
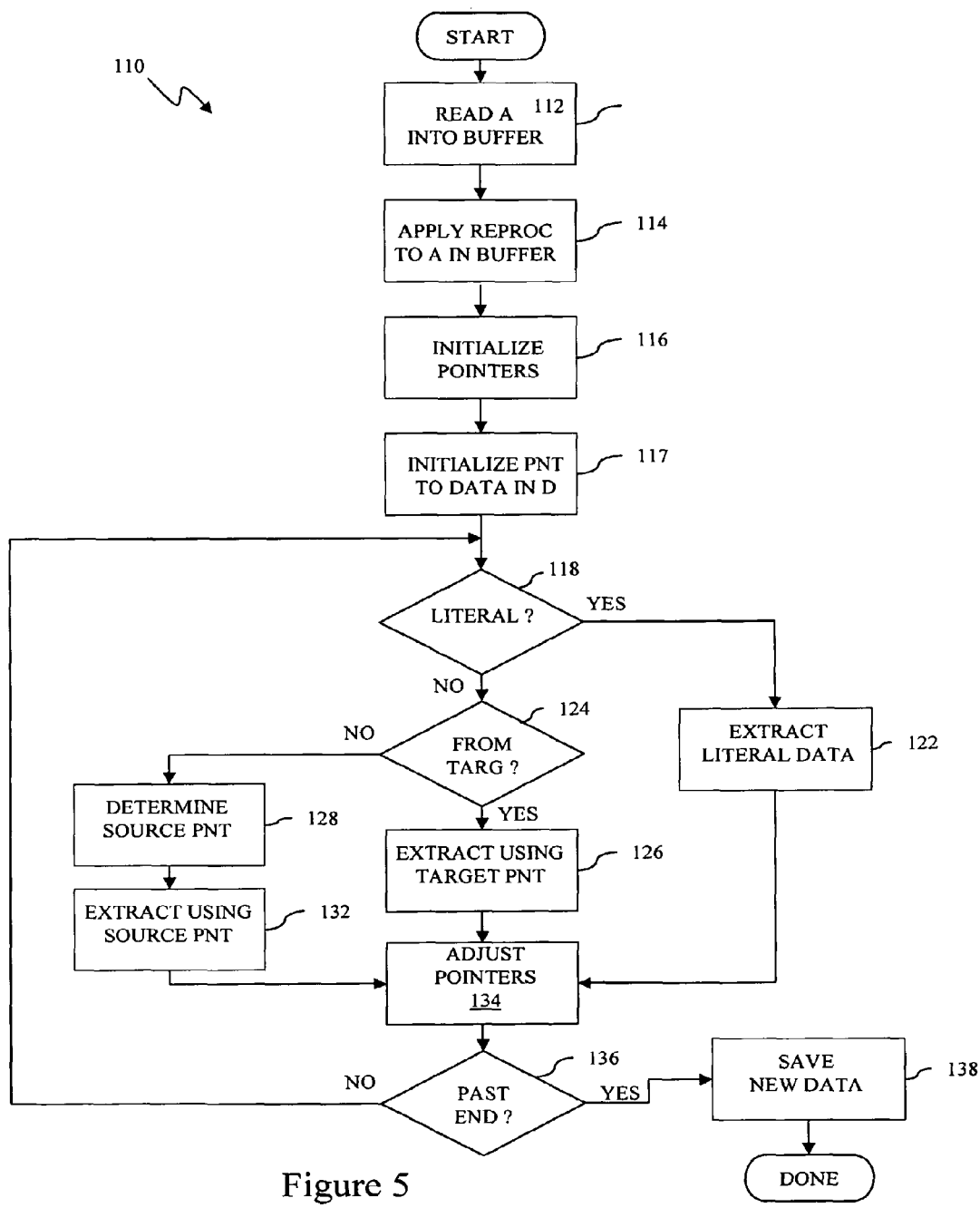
FIG. 5 is a flow chart illustrating steps performed in connection with a delta decompression routine constructing a new version of a data module using a delta data module and an initial version of the data module according to the system described herein.

Referring to FIG. 5, a flowchart 110 illustrates steps performed by the delta decompression routine 42. As discussed elsewhere herein, the delta decompression routine 42 receives the data module A and the delta data module D as inputs and outputs the data module A'. Processing begins at a first step 112 where the data module A is read into memory (or other appropriate storage location). In an embodiment herein, the data module A is read into the first part of the buffer 50 that is provided in volatile memory. Following the step 112 is a step 114 where any preprocessing performed at the step 66 of the flowchart 60 of FIG. 4 is applied to be data buffer 50 containing the data module A. As discussed elsewhere herein, the data module D may contain the instructions that relate to preprocessing.

Following the step 114 is a step 116 where the source pointer and the target pointer are initialized. At the step 116, the source pointer may be initialized to the beginning of the buffer 50 while the target pointer may be initialized to just past the end of the buffer 50, which will contain the data module A' once processing is complete. Following the step 116 is a step 117 where a pointer that points within the delta data module D is initialized. In an embodiment herein, the delta data module D contains, at the beginning thereof, the preprocessing instructions, which are followed by the mapping table 54. Thus, at the step 117, the delta data module D is initialized to point to just after the mapping table 54 within the delta data module D. Of course, the delta data module D may be arranged in any order by the delta compression routine 32 so long as the delta decompression routine knows the order and is capable of receiving and using the delta data module D.

Note that any other appropriate initializations may be performed at the step 116 and/or the step 117. For example, if the particular encoding that is used requires additional values to be initialized, the initialization may be performed at one or both of the step 116, 117.

Following the step 117 is a test step 118 which determines if the encoding pointed to by the pointer in the delta data module D indicates a literal encoding. If so, then control transfers from the test step 118 to a step 122 where the literal data, obtained from the encoding in the delta data module D, is provided (written) to the location pointed to by the target pointer. Otherwise, if it is determined at the test step 118 that the encoding pointed to by the pointer in the data module D does not indicate a literal encoding (and thus indicates that a matching pattern should be copied from within the buffer 50), then control transfers from the test step 118 to a test step 124 where it is determined if the encoding pointed to by the pointer in the data module D indicates that the matching pattern is closer to (and thus encoded as an offset from) the target pointer. If so, then control transfers from the test step 124 to a step 126 where the matching pattern, relative to the target pointer, is copied to the location currently pointed to by the target pointer.

If it is determined that the test step 124 that the encoding pointed to by the pointer in the data module D does not indicate that the matching pattern is relative to the target pointer (and thus is relative to the source pointer), then control transfers from the test step 124 to a step 128 where a value for the source pointer is determined. The source pointer value may be determined at the step 128 using the mapping table 54 which maps values of the target pointer to values for the source pointer. Thus, given the current value of the target pointer, the mapping table 54 may indicate how to set the source pointer at the step 128.

Following the step 128 is a step 132 where the matching pattern is copied to a location pointed to by the target pointer. Note that, unlike the step 126 where the matching pattern is provided relative to the target pointer, the step 132 obtains the matching pattern relative to the source pointer. Following the step 132 is a step 134 where the target pointer is incremented, the source pointer is incremented, and the pointer used to access data within the delta, data module D is incremented. Note that the step 134 also follows the steps 122, 126. Following the step 134 as a test step 136 where it is determined if the pointer in the delta data module D points past the end of the delta data module D. If not, then control transfers from the test step 136 back to the step 118, discussed above.

If it is determined at the test step 136 that the pointer to data in the delta data module D has been incremented at the step 134 points past the end of the delta data module D, then control transfers from the test step 136 to a step 138 where the data for the data module A', constructed in the buffer 50 as discussed above, is saved. In an embodiment herein, the data module A' may be saved at the step 138 to non-volatile memory, such as a disk drive. Of course, the module A' may be saved in any form on any medium using any techniques, as appropriate to the description herein. It is also possible to not save the data module A' at all. Also at the step 138, the data buffer 50 may be discarded. Following the step 138, processing is complete.

Figure 6:
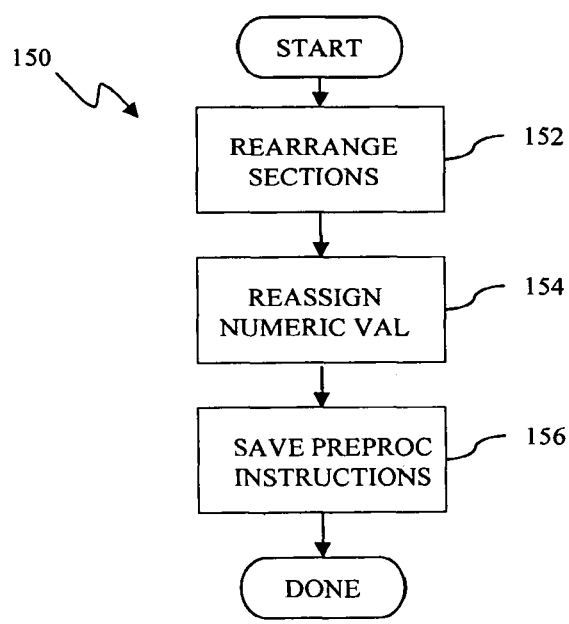
FIG. 6 is a flow chart illustrating steps performed in connection with preprocessing an initial version of a data module according to the system described herein.

Refer to FIG. 6, a flow chart 150 illustrate steps performed in connection with the step 66, discussed above, where preprocessing is performed. As discussed elsewhere herein, it is possible to perform any sort of preprocessing or, in some embodiments, no preprocessing at all. However, in some instances, preprocessing may make the data module A more similar to the data module A', and thus decrease the size of the delta data module D by increasing the likelihood of finding matching patterns. Also, as discussed elsewhere herein, the nature of the preprocessing depends upon the type of data stored in the data module A. In an embodiment herein, preprocessing may categorize the data module A as being one of the following conventional data file types: an x86 specific file, a CLI specific file, an x86-64 specific file, or an IA-64 specific file. The data module A may also be categorized as none of the above.

Processing begins a first step 152 where sections of the data module A are rearranged so that the ordering of the sections of the data module A more closely resembles the ordering of the sections of the data module A'. Following step 152 is a step 154 where numeric values used for tokens, such as function identifiers, are modified so that the numeric values used in the data module A more closely resemble the numeric values used in the data module A'. Following the step 154 is a step 156 where the preprocessing instructions generated by the processing performed at the step's 152, 154 are saved so that they may be included with the delta data module D and thus used to perform preprocessing on the data module A prior to decompression. Following the step 156, processing is complete.

In an embodiment herein, the preprocessing performed at the step 66 of the flowchart 60 a FIG. 3 may be used to construct the mapping table 54. Since the preprocessing performs at least one pass through the data module A and the data module A', it is possible for the preprocessing to construct at least a portion of the mapping table 54.

In an embodiment herein, the preprocessing performed at the step 66 includes replacing references to particular functions in the data module A (an executable) with references to the same or similar references in the data module A'. For example, if a particular function has an address of ADDR1 A and an address of ADDR2 in A', then the processing performed at the step 66 would replace function calls to ADDR1 in A with function calls to ADDR2. In this way, the data module A is made to resemble the data module A' more closely, thus potentially reducing the amount of data needed to represent the differences between A and A'. Note that the modified version of A is not save or executed but, instead, the changes to A are provided with the delta data module D to help reduce the size of D. Note also that it may be possible to derive the mapping table using information from the mapping between the functions in A and corresponding functions in A'.

Note that it is possible, in other embodiments, to use more than just the source pointer and the target pointer, in which case the encoding would indicate which of the plurality of pointers to use in connection with locating the matching pattern. In addition, it is possible to have the source pointer be maintained in a static location (e.g., the mid point of the data module A), in which case the mapping table 54 may not be necessary. It is also possible to maintain the target pointer at a static location, in which case some other mechanism may be used to determine the particular portion of the new version of the data module A' being encoded/constructed. Note also that, in the case of having additional pointers beyond the source pointer and the target pointer, some or all of the additional pointers may be maintained in a static location.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The term "computer-readable medium" as used herein refers to statutory articles of manufacture configured to store instructions and the like that are readable from the medium by computing devices and the like. The term "computer-readable medium" as used herein does not refer to signals and/or carrier waves per se, or any other non statutory subject matter per se.

The invention claimed is:

1. A method for compressing a new version of data relative to a previous version of the data resulting in delta data, the method performed on a computing device, the method comprising copying, by the computing device, common data from a selected location, where the common data represents a portion of the new version that matches a portion of the previous version, where the selected location is chosen from a first location and a second location according to a closer of a first distance and a second distance, where the first distance is from the first location that is in the new version to the matching common data in the new version, and where the second distance is from the second location that is in the previous version to the matching common data in the previous version.

2. The method of claim 1 where the first version represents software, and where the second version represents a newer version of the software.

3. The method of claim 1 further comprising processing, prior to the copying, differences in the first version between the first version and the second version.

4. The method of claim 3 where the processing comprises generating minimizing instructions.

5. The method of claim 4 where the delta data comprises the minimizing instructions.

6. The method of claim 1 where the copying comprises encoding the matching common data.

7. The method of claim 6 where the delta data comprises the encoded common data.

8. At least one computer-readable medium storing instructions that, when executed by a computing device, cause the computing device to perform actions for compressing a new version of data relative to a previous version of the data resulting in delta data, the actions comprising copying common data from a selected location, where the common data represents a portion of the new version that matches a portion of the previous version, where the selected location is chosen from a first location and a second location according to a closer of a first distance and a second distance, where the first distance is from the first location that is in the new version to the matching common data in the new version, and where the second distance is from the second location that is in the previous version to the matching common data in the previous version.

9. The at least one computer-readable medium of claim 8 where the first version represents software, and where the second version represents a newer version of the software.

10. The at least one computer-readable medium of claim 8, the actions further comprising processing, prior to the copying, differences in the first version between the first version and the second version.

11. The at least one computer-readable medium of claim 10 where the processing comprises generating minimizing instructions.

12. The at least one computer-readable medium of claim 11 where the delta data comprises the minimizing instructions.

13. The at least one computer-readable medium of claim 8 where the copying comprises encoding the matching common data.

14. The at least one computer-readable medium of claim 13 where the delta data comprises the encoded common data.

15. A computing device and at least one software module together configured for performing actions for compressing a new version of data relative to a previous version of the data resulting in delta data, the actions comprising copying common data from a selected location, where the common data represents a portion of the new version that matches a portion of the previous version, where the selected location is chosen from a first location and a second location according to a closer of a first distance and a second distance, where the first distance is from the first location that is in the new version to the matching common data in the new version, and where the second distance is from the second location that is in the previous version to the matching common data in the previous version.

16. The computing device and at least one software module of claim 15, the actions further comprising processing, prior to the copying, differences in the first version between the first version and the second version.

17. The computing device and at least one software module of claim 16 where the processing comprises generating minimizing instructions.

18. The computing device and at least one software module of claim 17 where the delta data comprises the minimizing instructions.

19. The computing device and at least one software module of claim 15 where the copying comprises encoding the matching common data.

20. The computing device and at least one software module of claim 19 where the delta data comprises the encoded common data.

* * * * *